Jan. 22, 1924.

B. B. OGIER 1,481,731

FLASH DEVICE

Filed July 5, 1922

B.B.Ogier
INVENTOR
BY Harpman
ATTORNEY

Jan. 22, 1924.

B. B. OGIER 1,481,731

FLASH DEVICE

Filed July 5, 1922

B. B. Ogier
INVENTOR

BY C. Harpman
ATTORNEY

Jan. 22, 1924.

B. B. OGIER 1,481,731

FLASH DEVICE

Filed July 5, 1922

B. B. Ogier
INVENTOR
BY Harpman
ATTORNEY

Patented Jan. 22, 1924.

1,481,731

UNITED STATES PATENT OFFICE.

BAXTER B. OGIER, OF YOUNGSTOWN, OHIO.

FLASH DEVICE.

Application filed July 5, 1922. Serial No. 572,926.

*To all whom it may concern:*

Be it known that BAXTER B. OGIER, citizen of the United States of America, residing at Youngstown, in the county of Mahoning and State of Ohio, has invented certain new and useful Improvements in Flash Devices, of which the following is a specification.

This invention relates to an improvement in flash machines, preferably for photographic uses, and the object thereof is to provide a construction which includes a number of receptacles receiving the materials for producing the flash, together with suitable mechanism for causing the materials in each receptacle to be ignited in turn in a positive and certain manner when the camera shutter is thrown open to make the exposure for a picture that is to be taken.

Reference is to be had to the accompanying drawings forming a part of the specification, in which the same characters of reference indicate the same parts in all the views.

Figure 1:
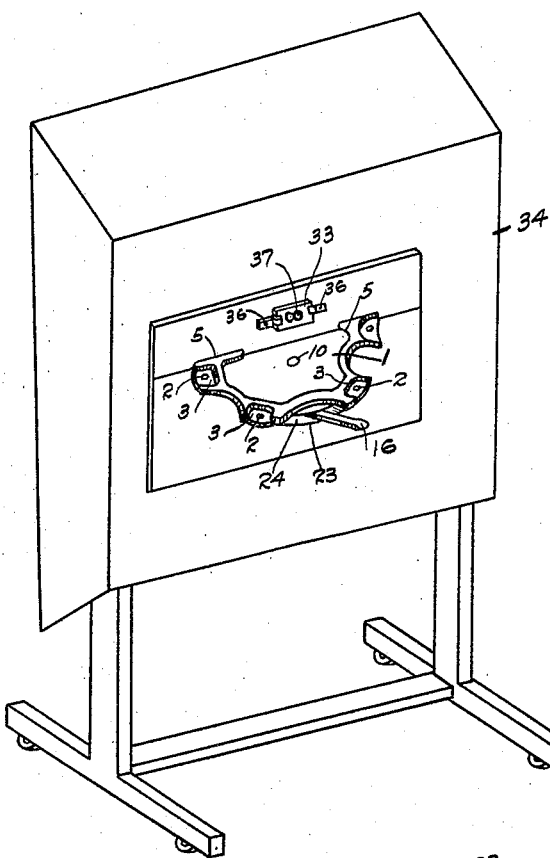
Figure 1 is a perspective view of an ordinary flash cabinet with my flash machine installed in the back of the same.

My invention comprises a rotating plate or disc 1 which carries mounted around the periphery thereof a plurality of recesses 2 formed within primary recesses 3. These primary recesses 3 are formed with side walls 4, formed so as to provide a shutter for closing openings 5 in a vertical wall portion 6 to which the mechanical elements of the device are attached.

Figure 3:
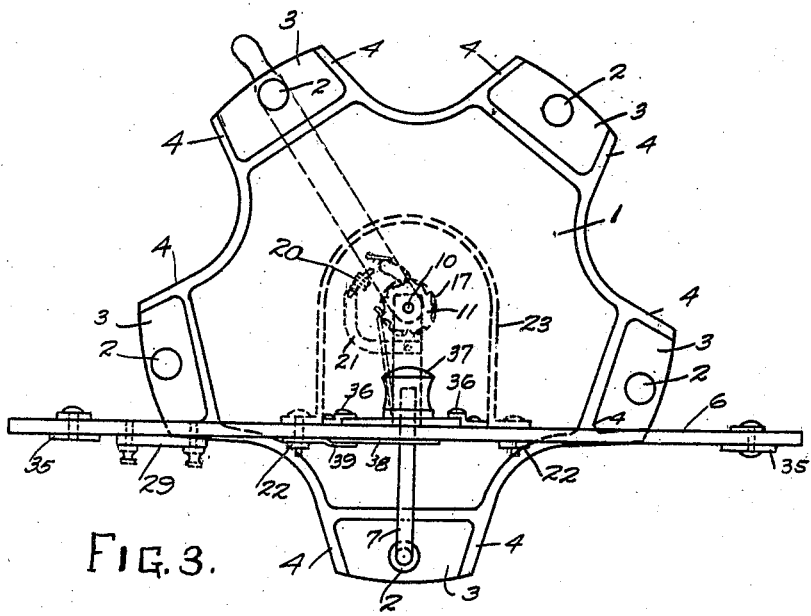
Figure 3 is a detail view showing a top plan view of the flash machine without the flash cabinet.

By referring to Figure 3 it will be seen that one of the plurality of recesses 2 is directly underneath an electrode 7 so that when a spark is caused to jump from this electrode 7 through the recesses 2 forming the other electrode, any flash compound retained within the recesses 2 will be ignited. When this flash takes place the side walls 4 close the openings 5, thereby eliminating the possibility of the flash compounds in the other recesses 2 from igniting. (See Figure 1.)

Figure 5:
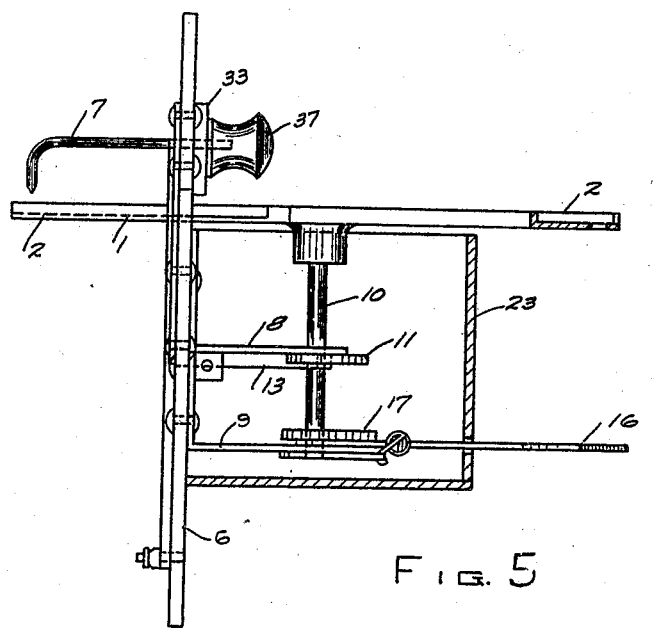
Figure 5 is a side elevation of the flash machine.
Figure 6:
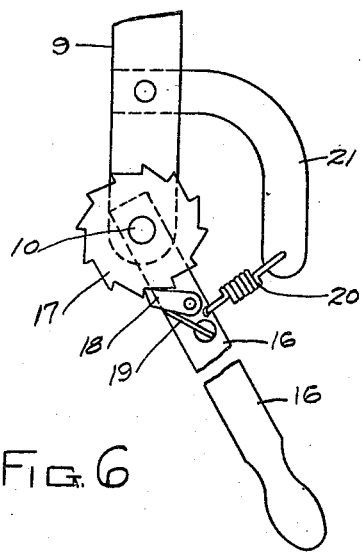
Figure 6 is a detail view showing operating lever and connecting parts.
Figure 7:
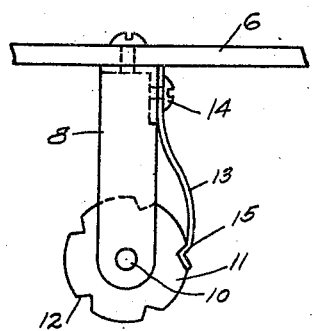
Figure 7 is a detail view showing action of a dog for holding a disc in a fixed relation in reference to other parts of the machine.

By referring to Figure 5 it will be seen that I have provided an upper bracket 8 and a lower bracket 9 for the support of vertical spindle 10 carrying the rotating plate or disc 1 at its upper end. Directly underneath the upper bracket 8 there is mounted upon the spindle 10 a small disc 11 provided with a plurality of V-shaped notches 12 corresponding with the plurality of recesses 2 in a plate or disc 1. Attached to this upper bracket 8 is a keeper 13 secured by means of bolt 14. The keeper 13 is preferably made of flat spring steel with an outer end 15 formed to engage in the V-shaped notches 12.

In operating this device the operator moves the handle 16 clockwise, thereby rotating the vertical spindle 10 by means of a ratchet 17 mounted upon said vertical spindle 10, engaging a dog 18 held in contact with said ratchet 17 by means of a spring 19. As the vertical spindle 10 rotates clockwise the plate or disc 1 moves one division of the number of units comprising the plurality of recesses 2, when the keeper 13 holds the spindle from undesired rotation until the operator wishes to advance the next recess 2 containing a flash compound. When the operator releases the handle 16 a coil spring 20 attached to an arm 21 and to the handle 16 pulls the handle 16 back into a starting position. Directly underneath the plate or disc 1 and attached to the vertical wall portion 6 by means of bolts 22 is a housing 23 provided with a slot 24 for the projection of the handle 16.

Figure 2:
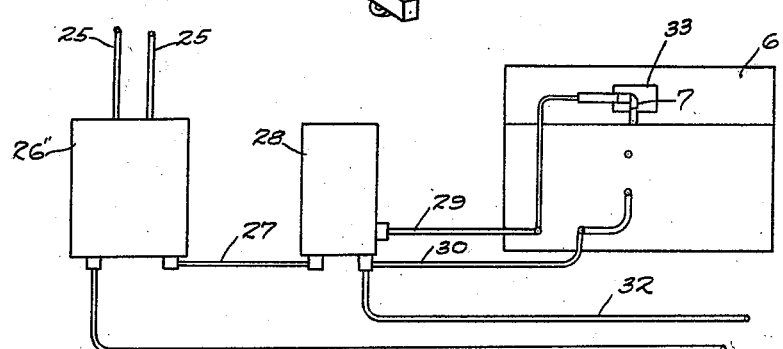
Figure 2 is a plan of the wiring showing the position of transformer and spark coil.
Figure 4:
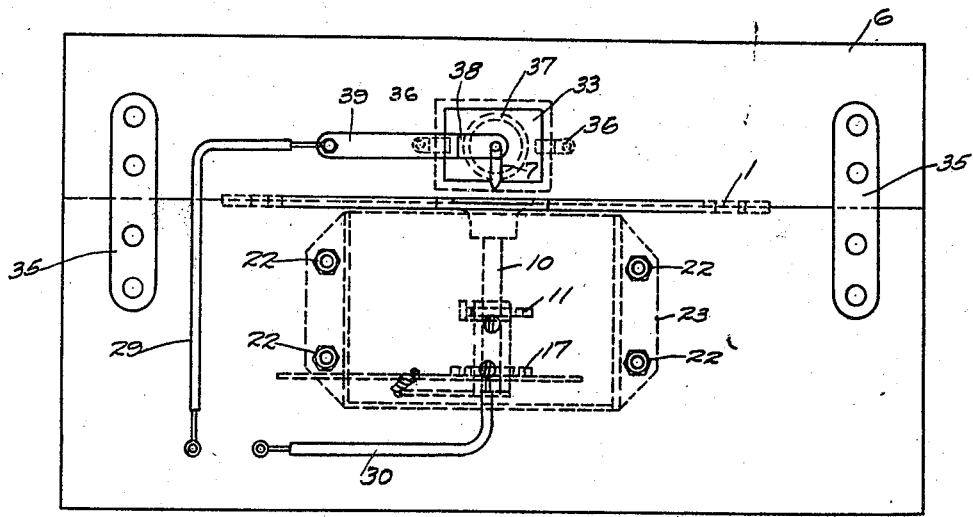
Figure 4 is a rear elevation of the flash machine.

By referring to Figures 2 and 4 the manner of carrying the electric current may be understood. Figure 2 shows incoming wires 25 which may be carrying 110 volts, such as is common in operating lights in house lighting, etc. These incoming wires 25 are connected to a transformer 26. Leading from this transformer 26 there is a wire 27 connecting to a spark coil 28 which has a wire 29 leading to the electrode 7. Also leading from the spark coil 28 there is a wire 30 leading to the plate or disc 1 which is preferably made of steel in order to form a second electrode. When the photographer causes by any means the opening of the shutter of his camera, the simultaneous contact of the wires 31 and 32 takes place, this completing the circuit and causing a spark to jump between the electrode 7 and the recesses 2 in a metallic plate or disc 1, thereby igniting the flash compound in said recess 2.

By referring to Figures 1 and 4 it will be seen that I have provided a rectangular door 33 carrying the electrode 7 so that when desired access to the interior of the cabinet 34 may be secured. This cabinet 34 may be of ordinary construction, and this particular part of the device is not claimed as new.

By referring to Figure 4 it will be seen that I have constructed a vertical wall portion 6 in two parts secured together by means of movable cleats 35. The purpose of having the vertical wall portion 6 made in two parts is for ease in assembling and construction of openings 5.

By referring to Figures 1, 3, 4 and 5 it will be seen that the rectangular door 33 supports the electrode 7. By placing the clasps 36 in a vertical position, the operator may remove the rectangular door 33 by grasping the knob 37. The principal reason for constructing the rectangular door 33 in this device is in order to remove the electrode 7 for cleaning.

By referring to Figure 3 it will be seen that I have provided a metallic plate 38 which comes in contact with the metallic plate 39, which is in turn connected with wire 29, (see Figure 4).

What I claim is:

1. In a flash machine, the combination of a revolving plate, a plurality of primary recesses, a plurality of recesses formed within said primary recesses, a vertical wall portion of a flash cabinet, means for closing openings in said vertical wall portion so as to eliminate danger of the flash from igniting flash compounds in other receptacles of a revolving plate which are back of said vertical wall portion, an electrode positioned above a recess for containing flash powders, a second electrode connecting said disc, means for causing a spark to jump between said electrodes, means for rotating said disc, means for holding said disc from undesirable rotation, substantially as described for the purpose set forth.

2. In a device of the class described, a vertical wall portion forming the rear portion of a flash cabinet, supported to said vertical wall portion two brackets, said brackets supporting a vertical spindle, said spindle carrying upon its upper end a revolving disc, said disc projecting partly through said vertical wall portion, a ratchet secured to said vertical spindle, an operating handle mounted upon said vertical spindle carrying a dog functioning with said ratchet, means for automatically returning said handle to starting position, a disc secured to said vertical spindle, V-shaped notches formed on the outer circumference of said disc, a spring keeper positioned so as to function in said V-shaped notches, substantially as described for the purpose set forth.

3. In a device of the class described, a vertical wall portion, a plurality of brackets attached to said vertical wall portion, a vertical spindle supported by said plurality of brackets, a plate mounted upon the upper end of said spindle, a plurality of recesses formed on the outer edge of said plate, means for rotating said spindle and plate, a removable rectangular door positioned in the vertical wall portion directly above said plate, means for securing said rectangular door, means for forming an electrical contact, an electrode secured to said rectangular door said electrode extending inwardly into a flash cabinet, substantially as described for the purpose set forth.

In testimony whereof I affix my signature.
BAXTER B. OGIER.

Witnesses:
C. A. HARPMAN,
E. GLASNER.